United States Patent [19]

Archey et al.

[11] Patent Number: 5,399,658
[45] Date of Patent: Mar. 21, 1995

[54] GAMMA-RADIATION-RESISTANT POLYCARBONATE COMPOSITION

[75] Inventors: Rick L. Archey, Pleasant Hills; Robert J. Kumpf, Pittsburgh; Aaron D. Meltzer, Carnegie; Harald Pielartzik, Pittsburgh, all of Pa.

[73] Assignee: Miles Inc., Pittsburgh, Pa.

[21] Appl. No.: 146,284

[22] Filed: Oct. 29, 1993

[51] Int. Cl.$^6$ ............................................. C08G 64/20
[52] U.S. Cl. ................................. 528/198; 523/136; 525/462; 525/534; 525/535; 528/176; 528/196; 528/370; 528/371; 528/372; 528/373; 528/487
[58] Field of Search ............... 528/167, 176, 196, 198, 528/199, 370, 371, 372, 373, 487; 523/136; 525/462, 534, 535

[56] References Cited

U.S. PATENT DOCUMENTS

| 3,909,490 | 9/1975 | Mark . | |
|---|---|---|---|
| 4,067,848 | 1/1978 | Ramey et al. . | |
| 4,804,692 | 2/1989 | Lundy et al. | 523/137 |
| 4,874,802 | 10/1989 | Lundy et al. | 524/94 |
| 4,880,855 | 11/1989 | Nelson et al. | 523/136 |
| 4,880,856 | 11/1989 | Avakian | 123/136 |
| 4,904,710 | 2/1990 | Nace | 523/137 |
| 4,939,185 | 7/1990 | Nelson et al. | 523/136 |
| 5,043,203 | 8/1991 | Fyvie et al. | 528/198 |
| 5,097,009 | 3/1992 | Fyvie et al. | 528/371 |
| 5,214,078 | 5/1993 | Powell et al. | 523/136 |
| 5,214,183 | 5/1993 | Fyvie et al. | 558/268 |

FOREIGN PATENT DOCUMENTS

| 303894 | 2/1989 | European Pat. Off. . |
| 4132629 | 4/1993 | Germany . |
| 63-198940 | 8/1988 | Japan . |

*Primary Examiner*—John Kight, III
*Assistant Examiner*—Shelley A. Dodson
*Attorney, Agent, or Firm*—Joseph C. Gil; Aron Preis

[57] ABSTRACT

A gamma radiation-resistant polycarbonate-disulfide resin is disclosed. The incorporation of disulfide linkages in the structure of polycarbonate was found to enhance the resistance of the resin to the discoloration caused by exposure to gamma radiation. Accordingly, processes for the incorporation of disulfide linkages in the molecular backbone, as end-groups or as side chains are disclosed. The polycarbonate-disulfide resin may be used as a molding resin in the context of thermoplastic molding compositions as well as a stabilizing additive in polycarbonate resin.

8 Claims, No Drawings

GAMMA-RADIATION-RESISTANT POLYCARBONATE COMPOSITION

FIELD OF THE INVENTION

The invention concerns polycarbonate resins and more particularly, resins the molecular structure of which have been modified to include disulfide linkages.

1. Summary of the Invention

A gamma radiation-resistant polycarbonate-disulfide resin is disclosed. The incorporation of disulfide linkages in the structure of polycarbonate was found to enhance the resistance of the resin to the discoloration caused by exposure to gamma radiation. Accordingly, processes for the incorporation of disulfide linkages in the molecular backbone, as end-groups or as side chains are disclosed. The polycarbonate-disulfide resin may be used as a molding resin in the context of thermoplastic molding compositions as well as a stabilizing additive in polycarbonate resin.

2. Background of the Invention

Polycarbonate resins are generally suitable for molding medical equipment and devices. A variety of medical devices, including blood filters, blood oxygenators and the like, have been molded of polycarbonates. Prior to use, these medical devices must be sterilized, preferably by exposure to ionization radiation, e.g. gamma radiation or electron beam radiation, for a prescribed period of time. While the physical and mechanical properties of polycarbonates are substantially unaffected by this radiation, the exposure results in an often undesirable change in the color, a general yellowing, of the resin.

It has been the object of several researchers in the field to identify the means to reduce this objectionable formation of color. The relevant patent literature includes U.S. Pat. Nos. 4,804,692; 4,874,802 and 4,904,710 which disclosed gamma radiation resistant polycarbonate compositions containing polyether polyols.

Also relevant is 11.08.88-JP198940 which disclosed a polycarbonate composition containing an ester having mercapto group of thio glycolic acid or mercapto-propionic acid and alcohol capable of being sterilized by exposure to radiation. Additionally relevant is DE-OS 41 32 629 which disclosed a polycarbonate composition containing a stabilizing aromatic compound containing sulfonic acid ester substituents; the composition being stabilized against exposure to gamma radiation. A radiation sterilizable composition used for medical devices containing a semi-crystalline polymer, a hindered phenolic stabilizer, phosphite and a thioester (or thioether) has been disclosed in EP 303,894. Enhancing the color stability to sterilization radiation of polymer compositions has been disclosed in U.S. Pat. No. 4,939,185. Accordingly, compounds having defined thioether groups, including dithiane, are said to stabilize aromatic polycarbonate upon exposure to sterilizing radiation. Compounds having sulfone functional groups and thiazole functional groups have been disclosed to enhance the color stability of polycarbonate compositions in U.S. Pat. No. 4,880,855 and 4,880,856, respectively.

U.S. Pat. Nos. 4,067,846 and 3,909,490 disclosed flame retardant polycarbonate compositions containing metal salts of sulfonic acids of aromatic sulfides. A cyclic polycarbonate oligomer is disclosed in U.S. Pat. No. 4,751,283. The oligomer may be prepared from monomers containing aromatic disulfides. Also relevant is pending U.S. patent application Ser. No. 07/891,875 filed Jun. 3, 1992, which disclosed a stabilizer entailing an aromatic disulfide. Also relevant is the co-pending patent application Ser. No. 08/018,623 (Mo-3913), filed Feb. 17, 1993, which disclosed a stabilizing agent for polycarbonate comprising a particular aliphatic disulfide optionally in conjunction with a polyether polyol.

DETAILED DESCRIPTION OF THE INVENTION

The aromatic polycarbonate-disulfide resin within the scope of the present invention is a homopolycarbonate or copolycarbonate having a weight average molecular weight of 500–100,000, preferably 10,000–40,000 and a sulfur content, derived from disulfide structural units, of 0.002 to 2 percent, preferably 0.02 to 0.2 percent relative to the weight of the resin.

Structurally the resin of the invention may be described as containing at least one of the following structural units:

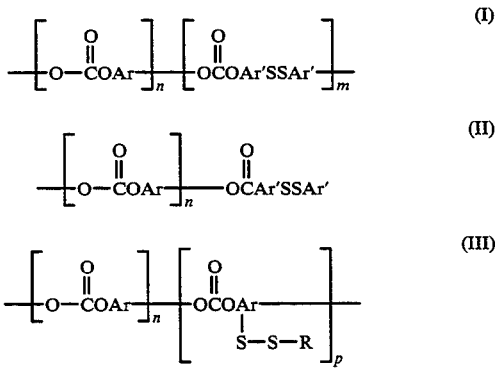

where
p, n and m are integers and where their relative magnitude is determined by the restriction on the sulfur content derived from disulfide structural units, and where
Ar, Ar' and R independently denote aromatic radicals.

The following example is presented for consideration:

Reference is made to an embodiment of the invention represented by a resin having a molecular weight of 10,000 and sulfur content of 1%:

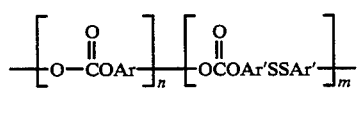

In the instance where Ar represents the residue of bisphenol-A (a diphenol used commonly in the manufacture of polycarbonate resin) and where Ar' represents a phenyl radical, the molecular weight of the structure marked (A) is about 254. The molecular weight of the unit designated (B) is about 276. The molecular weight of the unit —S—S— is 64. The determination of "n" and "m" would be as follows:

(64 m)/10,000=0.01,
m=1.56
and since,
254n+276m=10,000, substituting for m=1.56, n turns out to be about 38.

This is to say that for every resin characterized by its Ar, and Ar' radicals, molecular weight (within the range recited in the claims 500–100,000) and sulfur content (0.002 to 2%), there are definite, easily determined values of m and n.

Similar calculations are used in the determination of "n" and "p" in the resin described herein.

The polycarbonate-disulfide resins may be prepared, for example, by reacting a mixture of dihydroxy compounds and disulfide bisphenol with a carbonic acid derivative. Especially the process may be carried out in accordance with the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incorporated herein by reference). Applicant' invention involves replacing some of the dihydroxy compound by disulfide bisphenol. Alternatively, the polycarbonate-disulfide resins of the invention may be prepared by reacting a polycarbonate resin with sulfur monochloride so as to form disulfide side groups.

Disulfide bisphenol is a well known compound and its preparation is conventional. EP 474 259 is noted to describe a procedure for the preparation of disulfide bisphenol. In the practice of the invention, the disulfide bisphenol should have a purity greater than 90%, preferably greater than 95%.

The dihydroxy compounds (exclusive of disulfide bisphenol) suitable for the preparation of the polycarbonates of the invention conform to the structural formulae (1) or (2).

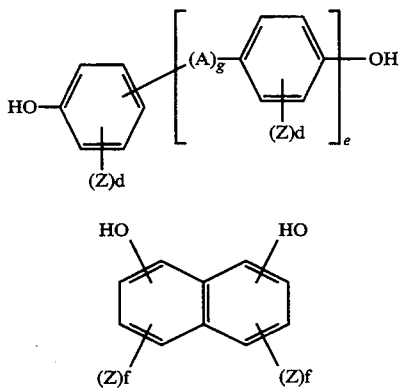

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

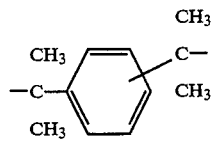

e and g both denote the number 0 to 1;
Z denotes F, Cl, Br or C$_1$-C$_4$-alkyl and if several Z radicals are substituents in one aryl radical, they may be identical or different from one another;
d denotes an integer of from 0 to 4; and
f denotes an integer of from 0 to 3.

Among the dihydroxy compounds useful in the practice of the invention are hydroquinone, resorcinol, bis-(hydroxy-phenyl)-alkanes, bis-(hydroxyphenyl)-ethers, bis-(hydroxy-phenyl)-ketones, bis-(hydroxy-phenyl)-sulfoxides, bis-(hydroxyphenyl)-sulfides, bis-(hydroxy-phenyl)-sulfones, and α,α-bis-(hydroxyphenyl)-diisopropylbenzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxy-phenyl)-2-methylbutane, 1,1 -bis-(4-hydroxyphenyl)-cyclohexane, α,α'-bis-(4-hydroxyphenyl)-p-diisopropylbenzene, 2,2-bis-(3-methyl-4-hydroxyphenyl)propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxy-phenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenols are 2,2-bis-(4-hydroxy-phenyl)propane (bisphenol A) and 4,4'-(3,35-trimethylcyclo-hexylidene)diphenol.

The polycarbonates of the invention may entail in their structure units derived from one or more of the suitable bisphenols.

The polycarbonates of the invention may also be branched by condensing therein small quantities, e.g., 0.05–2.0 mol % (relative to the bisphenols) of polyhydroxyl compounds. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxy-phenyl)heptane; 1,3,5-tri-(4-hydroxphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxyphenyl)-propane and 1,4-bis-(4,4'-dihydroxytriphenylmethyl)benzene.

Some of the other polyfunctional compounds are 2,4-dihydroxy-benzoic acid, trimesic acid, cyanuric chloride and 3,3-bis-(4-hydroxyphenyl)2-oxo-2,3-dihydroindole.

In the preparation of the polycarbonate disulfide resins of the invention by the diphasic polycondensation method, a small portion of the dihydroxy compounds is replaced by disulfide bisphenol. The amount of the disulfide bisphenol is that amount which would yield in the final product a level of sulfur as noted above.

In the alternate method for the preparation of the polycarbonate disulfide of the invention, there is reacted a polycarbonate resin in solution (up to 50% polycarbonate)in an appropriate solvent with sulfur monochloride. The appropriate solvents include the known non-aromatic solvents for polycarbonate, such as methlyene chloride, chloroform, THF cyclohexane and dioxane.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

Polycarbonates suitable in the present invention are well known and the processes for their preparation are old in the art.

The suitable processes for preparing polycarbonate resins are well known and have been described in the literature, including U.S. Pat. Nos. 3,028,365; 2,999,846; 3,153,008; 2,991,273; 3,030,331; 3,169,121; 3,395,119; 3,729,447; 4,255,556; 4,260,731; 4,369,303 and 4,714,746 all of which are incorporated herein by reference.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5-24, 13-16, 7.5-13.0 and 3.5-6.5 gm/10 min., respectively. These are products of Miles Inc. of Pittsburgh, Pa.

The polycarbonate-disulfide stabilizer is characterized in that it has a weight average molecular weight in the range of about 500 to 100,000 preferably 10,000 to 40,000 and in that it contains sulfur at an amount of about 0.002 to 2, preferably 0.02 to 0.2 percent relative to its weight.

In a preferred embodiment of the invention the thermoplastic composition further contains a compound conforming to

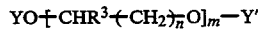

where
Y and Y' independently are hydrogen atom or $C_{1-30}$-alkyl or acyl radicals, pyranyl or sylil group, preferably hydrogen, $C_{1-5}$-alkyl or pyranyl radicals,
m is 1 to 70 preferably 4 to 50,
n is 1 to 4, preferably 1, and
$R^3$ denotes a hydrogen atom, a $C_{1-22}$-alkyl, cycloalkyl, aryl, alkylaryl or cycloalkylaryl radicals, preferably, $C_{1-5}$ alkyl radicals.

Compounds of this type are known and have been disclosed in U.S. Pat. Nos. 4,804,692; 4,874,802; and 4,904,710, the specification of which are incorporated by reference herein. In the practice of this embodiment of the invention the compound may be incorporated in a positive amount up to 5.0 % by weight, preferably, 0.1 to 1.5%, said percent being relative to the weight of the composition.

Conventional additives may be incorporated in the polycarbonate-disulfide according to the invention in the usual quantities before or during or after preparation of the mixtures. The following are suitable additives: Fillers such as, for example, mineral fillers, plasticizers, fluidizing agents, and stabilizers against the deleterious effects of UV radiation, heat, moisture and oxygen, as well as pigments and flame-retardants.

The invention is further illustrated but is not intended to be limited by the following examples in which all parts and percentages are by weight unless otherwise specified.

EXAMPLES

Experimental

A. Preparation of polycarbonates containing units derived from disulfide bisphenol (i) Disulfide bisphenol (0.05 mol, 12.52 g), 80 ml of methylene chloride and triethylamine (0.15 mol, 15 ml) and 0.6 g of p-DMP were all charged to a 3-neck flask. After cooling the solution to 0° C., a solution of bisphenol A bischloroformate (0.05 mol, 17.66 g), in 40 ml methylene chloride was slowly added. After addition was complete, the solution was allowed to warm to room temperature and was stirred for 16 hours. The triethylamine hydrochloride was removed via filtration. The solution was precipitated into isopropanol, redissolved in methylene chloride and re-precipitated to yield a polycarbonate having a weight average molecular weight of 13,000.

(ii) Disulfide bisphenol (0.05 mol, 12.52 g), 80 ml of methylene chloride and triethylamine (0.15 mol, 15 ml) and 0.6 g of o-DMP were all charged to a 3-neck flask. After cooling the solution to 0° C., a solution of bisphenol A bischloroformate (0.05 mol, 17.66 g) in 40 ml methylene chloride was slowly added. After addition was complete, the solution was allowed to warm to room temperature and was stirred for 16 hours. The triethylamine hydrochloride was removed via filtration. The solution was precipitated into isopropanol, redissolved in methylene chloride and re-precipitated to yield a polycarbonate having a weight average molecular weight of 15,000.

(iii) Disulfide bisphenol (0.05 mol, 12.52 g), 80 ml of THF and triethylamine (0.15 mol, 1 ml) and 0.6 g of p-DMP ere all charged to a 3-neck flask. After cooling the solution to 0° C., a solution of bisphenol A bischloroformate (0.05 mol, 17.66 g), in 40 ml THF was slowly added. After addition was complete, the solution was allowed to warm to room temperature and was stirred for 16 hours. The triethylamine hydrochloride was removed via filtration. The solution was precipitated into isopropanol, redissolved in methylene chloride and re-precipitated to yield a polycarbonate having a weight average molecular weight of 700.

(iv) disulfide bisphenol (0.05 mol, 12.52 g), 80 ml of THF and triethylamine (0.15 mol, 15 ml) and 0.6 g of o-DMP were all charged to a 3-neck flask. After cooling the solution to 0° C., a solution of bisphenol A bischloroformate (0.05 mol, 17.66 g) in 40 ml THF was slowly added. After addition was complete, the solution was allowed to warm to room temperature and was stirred for 16 hours. The triethylamine hydrochloride was removed via filtration. The solution was precipitated into isopropanol, redissolved in methylene chloride and re-precipitated to yield a polycarbonate having a weight average molecular weight of 3400.

B. Preparation of polycarbonates containing disulfide side groups units 200 g of Makrolon CD-2000 polycarbonate, a homopolycarbonate based on bisphenol A, having a melt flow index of 60 g/10 min (a commercial product of Miles) were dissolved in methylene chloride in a three neck flask. With a dropping funnel, 50 g of sulfur monochloride was added over several hours. The solution was stirred for 24 hours at room temperature with the hydrogen chloride by-product being scrubbed with a sodium bicarbonate solution. The resultant solution was diluted with 1 liter of methylene chloride and precipitated into 4 liters of isopropanol. The powdered polymer was filtered and stirred in a sodium bicarbonate solution to neutralize any residual sulfur chloride. The polymer was again filtered, redissolved in 1 liter of methylene chloride and re-precipitated into 4 liters of isopropanol. The powdered polymer was filtered and washed with hexane.

C. Polycarbonate compositions embodying the invention have been prepared and their properties evaluated as summarized below Comparison examples entailing unmodified polycarbonate resin were also prepared and their properties compared to the inventive compositions. In all cases, the polycarbonate used was Makrolon 2508 resin, a homopolycarbonate based on bisphenol-A having a melt flow index of about 15 g/10 minutes per ASTM D 1238, a product of Miles. A modified Poly(propylene glycol)—Multranol DHP from Miles—having a molecular weight of about 2000 was used where indicated. The preparation of the compositions followed conventional procedures including tumble blending and extrusion (ZSK-30 twin screw extruder) at about 270° C. The extruded strands were cooled and then chopped into pellets prior to molding by injection (at 280° C.) into 0.100" thick color chips. The chips were subjected to gamma radiation (3 mrad) and the yellowness indices of the as-molded and irradiated chips were measured in accordance with the procedure outlined in ASTM D-1925, taking the measurement approximately 24 hours after the gamma radiation. In the table below, DSBP-PC denotes a polycarbonate resin, the structure of which has been modified by replacing some of the structural units derived from bisphenol-A by disulfide bisphenol; PC-SS denotes modified polycarbonate resin which has been modified to include disulfide side chains.

The table below contains the test data relative to the compositions of the invention set in comparison to other relevant compositions; the amounts are indicated in weight-percent (pbw):

| Example | 1 | 2 | 3 | 4 | 5 |
|---|---|---|---|---|---|
| Polycarbonate, pbw* | 100 | 99.5 | 99.75 | 99.5 | 99.5 |
| Multranol-DHP | — | 0.5 | — | 0.25 | 0.25 |
| DSBP-PC** | — | — | 0.25 | 0.25 | — |
| PC-SS*** yellowness index | — | — | — | — | 0.25 |
| Initial | 5.04 | 2.92 | 4.48 | 3.04 | 8.86 |
| after exposure | 24.5 | 14.1 | 18.25 | 17.66 | 10.82 |

-continued

| Example | 1 | 2 | 3 | 4 | 5 |
|---|---|---|---|---|---|
| difference | 19.5 | 11.2 | 13.77 | 14.62 | 1.96 |

*an unmodified homopolycarbonate based on bisphenol-A (Makrolon 2508 resin)
**DSBP-PC denotes modified polycarbonate wherein some BPA units have been replaced by disulfide bisphenol units.
***PC-SS denotes a modified polycarbonate containing disulfide side groups.

D. Preparation of polycarbonates containing disulfide side groups units 200 g of Makrolon CD-2000 polycarbonate a homopolycarbonate based on bisphenol A, having a melt flow index of 60 g/10 min (a commercial product of Miles) were dissolved in 1000 ml methylene chloride in a three neck flask. With a dropping funnel, 0.250 g of sulfur monochloride was added over several hours. The solution was stirred for 24 hours at room temperature with the hydrogen chloride by-product being scrubbed with a sodium bicarbonate solution. The resultant solution was diluted with 1 liter of methylene chloride and precipitated into 4 liters of isopropanol. The powdered polymer was filtered and stirred in a sodium bicarbonate solution to neutralize any residual sulfur chloride. The polymer was again filtered, redissolved in 1 liter of methylene chloride and reprecipitated into 4 liters of isopropanol. The powdered polymer was filtered and washed with hexane.

The total sulfur content in the thus modified polycarbonate was 0.017%. The resin was molded into test chips and exposed to gamma radiation (3 mrad) and the yellowness indices of the "as molded" and of the irradiated chips were measured as described above. The initial yellowness index was 11.2, the final Y.I was 26.5, the difference was thus 15.3.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a carbonate resin which has a weight average molecular weight of 500 to 100,000 and sulfur content of 0.002 to 2 percent, said resin containing at least one structural unit selected from the group consisting of

(I)

(II)

and

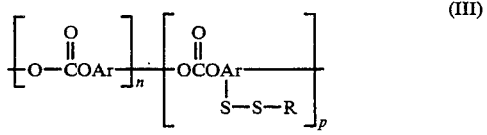

(III)

where

Ar, Ar' and R independently are aromatic radicals, p, n and m are integers and where their relative magnitude is determined by said sulfur content, said sulfur being derived from said disulfide structural units and said percent being relative to the weight of said resin.

2. The composition of claim 1 wherein said sulfur content is 0.02 to 0.2 percent.

3. In the diphasic interface polycondensation process for the preparation of polycarbonate resins which process includes reacting carbonic acid derivative and a dihydroxy compound the improvement comprising replacing a portion of said dihydroxy compound by disulfide bisphenol, said portion sufficient to produce the resin of claim 1.

4. A process for preparing a thermoplastic resin comprising reacting a polycarbonate resin in solution with sulfur monochloride to produce a resin conforming structurally to said (iii) of claim 1, said polycarbonate resin in solution characterized in that its structure contains no disulfide units, said solution containing up to 50% polycarbonate and a solvent selected from the group consisting of non-aromatic solvents for polycarbonates.

5. The process of claim 4 further comprising the step of scrubbing hydrogen chloride by-product with sodium bicarbonate solution.

6. A thermoplastic molding composition comprising aromatic polycarbonate and an additive amount of the resin of claim 1, said amount being sufficient to render the composition resistant to degradation caused by exposure to gamma radiation.

7. The thermoplastic molding composition of claim 1 further containing a positive amount, up to 5 percent by weight of a compound conforming to

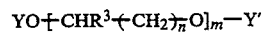

where
Y and Y' independently are hydrogen atom or $C_{1-30}$-alkyl or acyl radicals, pyranyl or sylil group,
m is 1 to 70,
n is 1 to 4, and
$R^3$ denotes a hydrogen atom, a $C_{1-22}$ alkyl, cycloalkyl, aryl, alkylaryl or cycloalkylaryl radicals.

8. The thermoplastic composition of claim 6 further containing a positive amount, up to 5 percent by weight of a compound conforming to

where
Y and Y' independently are hydrogen atom or $C_{1-30}$-alkyl or acyl radicals, pyranyl or sylil group,
m is 1 to 70,
n is 1 to 4, and
$R^3$ denotes a hydrogen atom, a $C_{1-22}$-alkyl, cycloalkyl, aryl, alkylaryl or cycloalkylaryl radicals.

* * * * *